United States Patent
Shawcross et al.

(10) Patent No.: US 6,767,394 B2
(45) Date of Patent: Jul. 27, 2004

(54) DYE COMPOSITION

(75) Inventors: Andrew Paul Shawcross, Manchester (GB); Mark Holbrook, Manchester (GB); Paul Nicholas Ewing, Manchester (GB)

(73) Assignee: Avecia Limited, Manchester (GB)

( * ) Notice: Subject to any disclaimer, the term of this patent is extended or adjusted under 35 U.S.C. 154(b) by 128 days.

(21) Appl. No.: 10/220,637

(22) PCT Filed: Feb. 15, 2001

(86) PCT No.: PCT/GB01/00609

§ 371 (c)(1),
(2), (4) Date: Sep. 4, 2002

(87) PCT Pub. No.: WO01/66651

PCT Pub. Date: Sep. 13, 2001

(65) Prior Publication Data

US 2003/0136301 A1 Jul. 24, 2003

(30) Foreign Application Priority Data

Mar. 4, 2000 (GB) .............................. 0005163

(51) Int. Cl.⁷ .......................... C09D 11/00; C09D 11/02; B05D 1/26; B32B 27/14; B41J 2/01
(52) U.S. Cl. ............................ 106/31.48; 8/673; 8/681; 8/688; 347/100; 428/195.1; 427/466
(58) Field of Search .......................... 106/31.48; 8/673, 8/681, 688; 347/100; 427/466; 428/195.1; 534/766, 772, 797

(56) References Cited

U.S. PATENT DOCUMENTS

| | | | | |
|---|---|---|---|---|
| 5,163,971 A | * | 11/1992 | Stawitz et al. ................. 8/549 |
| 5,324,330 A | * | 6/1994 | Schaulin et al. ................ 8/639 |
| 5,439,517 A | * | 8/1995 | Yoshida et al. ........... 106/31.48 |
| 5,622,550 A | * | 4/1997 | Konishi et al. ........... 106/31.48 |
| 5,728,201 A | * | 3/1998 | Saito et al. ............... 106/31.48 |
| 6,551,390 B1 | * | 4/2003 | Lavery et al. ............. 106/31.48 |
| 6,605,144 B1 | * | 8/2003 | Watkinson et al. ...... 106/31.48 |

FOREIGN PATENT DOCUMENTS

| EP | 0763576 A2 | 3/1997 |
|---|---|---|
| GB | 2332439 A | 6/1999 |
| WO | WO 98/14524 | 4/1998 |

* cited by examiner

*Primary Examiner*—Helene Klemanski
(74) *Attorney, Agent, or Firm*—Pillsbury Winthrop LLP

(57) ABSTRACT

A composition comprising a dye of Formula (I) and a dye of Formula (II) or salts thereof, and use of the composition in ink jet printing Formula (I)

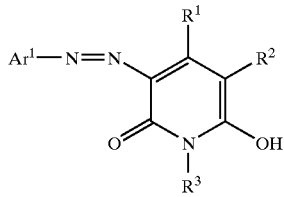

Formula (II)

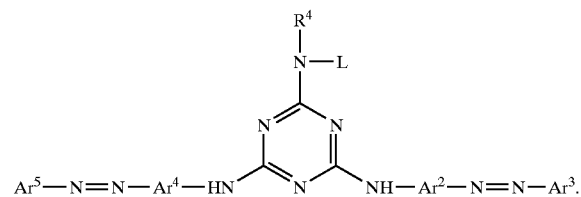

25 Claims, No Drawings

DYE COMPOSITION

CROSS REFERENCE TO RELATED APPLICATIONS

This application is a national phase application of International Application No. PCT/GB01/00609, filed Feb. 15, 2001, and which further claims priority from British Application No. 0005163.1, filed Mar. 4, 2000. These applications, in their entirety, are incorporated herein by reference.

This invention relates to dye compositions and to their use in ink jet printing ("IJP"). IJP is a non-impact printing technique in which droplets of coloured liquids are ejected through a fine nozzle onto a substrate without bringing the nozzle into contact with the substrate.

There are many demanding performance requirements for dyes and inks used in IJP. For example they desirably provide sharp, non-feathered images having good waterfastness, light-fastness, chroma, and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle. Thermal and piezoelectric ink jet printers are widely used, thus there is a need for inks, suitable for use in both types of printers, having high colour strength and giving images having good light fastness when printed on a typical substrate, especially plain paper.

Inks containing dyes are known for example from U.S. Pat. No. 5,622,550 which discloses a yellow ink composition comprising a mixture of a triazine linked carboxylated azo benzenoid dye with a triazine linked sulphonated azo benzenoid dye or a pyrazolone linked sulphonated dye.

EP 763 576 discloses the use of yellow dye mixtures comprising dyes containing carboxy groups with dyes containing a $SO_3H$ group.

We have found that a combination of a triazine linked azo benzenoid dyes with a pyridone dye provides an improved balance of lightfastness, chroma and dye solubility.

According to a first aspect of the present invention there is provided a composition comprising a dye of Formula (I) and a dye of Formula (II) or salts thereof:

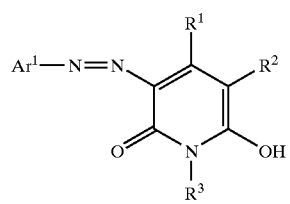

Formula (I)

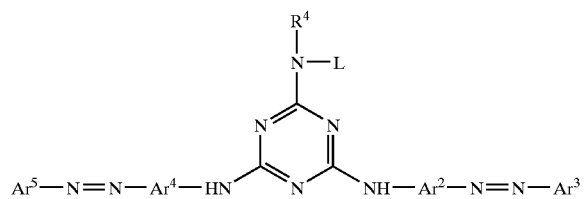

Formula (II)

wherein $Ar^1$, $Ar^2$, $Ar^3$, $Ar^4$ and $Ar^5$ are each independently optionally substituted aryl;

$R^1$ is alkyl, alkenyl, alkynyl, pyridinium or aryl, each of which is substituted or unsubstituted, or H;

$R^2$ is alkyl, alkenyl, alkynyl, pyridinium or aryl, each of which is substituted or unsubstituted, H, C(O)OH, CN, $NR^5R^6$ or $C(O)NR^5R^6$; and $R^3$, $R^4$, $R^5$ and $R^6$ each independently are alkyl, alkenyl, alkynyl or aryl, each of which is substituted or unsubstituted, or H;

L is H or L and $R^4$ together with the N atom to which they are attached form an optionally substituted 5- or 6-membered ring.

Preferably the dye of Formula (I) is of the formula:

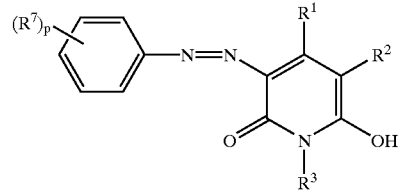

wherein:

$R^7$ is alkyl, alkoxy, alkenyl, alkynyl or aryl, each of which is substituted or unsubstituted, H, $SO_3H$, C(O)OH, $PO_3H$, $NR^5R^6$ or $C(O)NR^5R^6$;

p is 0, 1, 2 or 3; and $R^1$, $R^2$, $R^3$, $R^5$ and $R^6$ are as defined above.

Preferably the dye of Formula (II) is of the formula:

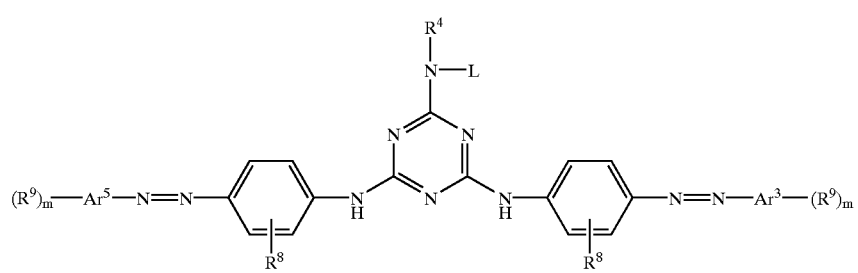

wherein
  each $R^8$ independently is alkyl, alkenyl, alkynyl or aryl, each of which is substituted or unsubstituted, H, NHC(O)$R^5$ or NHC(O)N$R^5R^6$;
  each $R^9$ independently is alkyl, alkenyl, alkynyl, or aryl, each of which is substituted or unsubstituted, H, SO$_3$H, PO$_3$H or NH$_3^+$;
  each m independently is 0, 1, 2 or 3; and
  L, $R^4$, $R^5$, $R^6$, Ar$^3$ and Ar$^5$ are as defined above.
  Preferably L is H.
  Preferably $R^1$ is $C_1$–$C_{25}$alkyl, $C_2$–$C_{25}$alkenyl, $C_{2\text{-}25}$alkynyl, pyridinium or aryl, each of which is substituted or unsubstituted, or H; more preferably $R^1$ is H or optionally substituted $C_1$–$C_{15}$alkyl; most preferably $R^1$ is $C_1$–$C_{10}$alkyl or —SO$_3$H substituted $C_1$–$C_{10}$alkyl;
  Preferably $R^2$ is $C_1$–$C_{25}$alkyl, $C_2$–$C_{25}$alkenyl, $C_2$–$C_{25}$alkynyl, pyridinium or aryl, each of which is substituted or unsubstituted, H, C(O)OH, CN, N$R^5R^6$ or C(O)N$R^5R^6$; more preferably $R^2$ is pyridinium or $C_1$–$C_{15}$alkyl each of which is substituted or unsubstituted, H, C(O)OH, CN, N$R^5R^6$ or C(O)N$R^5R^6$; most preferably $R^2$ is pyridinium or $C_1$–$C_{10}$alkyl, each of which is substituted or unsubstituted H, C(O)OH, CN, N$R^5R^6$ or C(O)N$R^5R^6$.
  Preferably $R^3$, $R^4$, $R^5$ and $R^6$ each independently are $C_1$–$C_{25}$alkyl, $C_2$–$C_{25}$alkyenyl, $C_2$–$C_{25}$alkynyl or aryl, each of which is substituted or unsubstituted, or H; more preferably $R^3$, $R^4$, $R^5$ and $R^6$ each independently are $C_1$–$C_{20}$alkyl, $C_2$–$C_{20}$alkyenyl, $C_2$–$C_{20}$alkynyl or aryl, each of which is substituted or unsubstituted, or H; most preferably $R^3$, $R^4$, $R^5$ and $R^6$ each independently are H or optionally substituted $C_1$–$C_{10}$alkyl.
  Preferably $R^7$ is $C_1$–$C_{25}$alkyl, $C_1$–$C_{25}$alkoxy, $C_2$–$C_{25}$alkenyl, $C_2$–$C_{25}$alkynyl or aryl, each of which is substituted or unsubstituted, H, SO$_3$H, C(O)OH, PO$_3$H, N$R^5R^6$ or C(O)N$R^5R^6$; more preferably $R^7$ is $C_1$–$C_{15}$alkyl or aryl, each of which is substituted or unsubstituted, H, SO$_3$H, C(O)OH, PO$_3$H, N$R^5R^6$ or C(O)N$R^5R^6$; most preferably $R^7$ is $C_1$–$C_{10}$alkyl or aryl, each of which is substituted or unsubstituted, H, SO$_3$H, C(O)OH, PO$_3$H, N$R^5R^6$ or C(O)N$R^5R^6$.
  Preferably each $R^8$ independently is $C_1$–$C_{25}$alkyl, $C_2$–$C_{25}$alkyenyl, $C_2$–$C_{25}$alkynyl or aryl, each of which is substituted or unsubstituted, H, NHC(O)$R^5$ or NHC(O)N$R^5R^6$; more preferably each $R^8$ independently is optionally substituted $C_1$–$C_{10}$alkyl, H, NHC(O)$R^5$ or NHC(O)N$R^5R^6$; most preferably each $R^8$ independently is H, optionally substituted $C_1$–$C_5$alkyl, NHC(O)$R^5$ or NHC(O)N$R^5R^6$.
  Preferably each $R^9$ independently is $C_1$–$C_{25}$alkyl, $C_2$–$C_{25}$alkyenyl, $C_2$–$C_{25}$alkynyl or aryl, each of which is substituted or unsubstituted, H, SO$_3$H, PO$_3$H or NH$_3^+$; more preferably each $R^9$ independently is optionally substituted $C_1$–$C_{10}$alkyl, H, SO$_3$H, PO$_3$H, or NH$_3^+$; most preferably each $R^9$ independently is H or SO$_3$H.
  Preferably Ar$^1$, Ar$^2$, Ar$^3$, Ar$^4$ and Ar$^5$ each independently are phenyl or napthyl; more preferably Ar$^1$, Ar$^2$ and Ar$^4$ each independently are phenyl; and more preferably Ar$^3$ and Ar$^5$ each independently are napthyl.
  Preferably each m independently is 1, 2 or 3.
  In a particularly preferred embodiment of the present invention $R^1$ is $C_1$–$C_{10}$alkyl or —SO$_3$H substituted $C_1$–$C_{10}$alkyl; $R^2$ is CN, optionally substituted pyridinium or optionally substituted $C_1$–$C_{10}$alkyl; $R^3$, $R^4$, $R^5$ and $R^6$ each independently are H or optionally substituted $C_1$–$C_{10}$alkyl; $R^7$ is SO$_3$H, C(O)OH or optionally substituted $C_1$–$C_{10}$alkyl; each $R^8$ is independently H, $C_1$–$C_5$alkyl, NHC(O)$R^5$, NHC(O)N$R^5R^6$; each $R^9$ independently is SO$_3$H; Ar$^1$, Ar$^2$ and Ar$^4$ are phenyl; Ar$^3$ and Ar$^5$ are napthyl; and each m independently is 1 or 2.
  When $R^1$, $R^2$, $R^3$, $R^4$, $R^5$, $R^6$, $R^7$, $R^8$, $R^9$ or the 5- or 6-membered ring formed by L and $R^4$ together with the N atom to which they are attached are optionally substituted the optional substituents include but are not limited to —S—; —O—; hydroxy; cyano; carboxyl; sulpho; nitro; ureido; $C_1$–$C_4$alkyl, for example methyl, ethyl propyl, iso-propyl, n-butyl, sec-butyl, tert-butyl or iso-butyl; halogen, for example fluorine, chlorine or bromine; $C_1$–$C_4$alkoxy, for example methoxy, ethoxy, propoxy or butoxy; $C_1$ to $C_4$ alkoxycarbonyl, for example methoxy carbonyl or ethoxy carbonyl; —NHC(O)$R^{10}$, —N$R^{10}R^{11}$, —C(O)N$R^{10}R^{11}$, —CH$R^{10}R^{11}$ where $R^{10}$ and $R^{11}$ each independently are H or $C_1$–$C_6$alkyl or where $R^{10}$ and $R^{11}$ together with the atom to which they are attached form an optionally substituted 5- or 6-membered ring, preferably an optionally substituted pyrrolidino, morpholino, piperidino or tetrahydrofuran ring.
  When L and $R^4$ together with the N atom to which they are attached form an optionally substituted 5- or 6-membered ring, the ring preferably comprises 3, 4 or 5 carbon atoms and optionally sulphur, oxygen and/or nitrogen atom(s). In a preferred embodiment L and $R^4$ form an optionally substituted pyrrolidino, morpholino, piperidino or tetrahydrofuran ring, most preferably a morpholino ring.
  Preferably the weight ratio of the dye of Formula (I) to the dye of Formula (II) is from 1:10 to 10:1, more preferably 1:5 to 5:1, especially 1:3 to 3:1, more especially 1:2 to 1:2, particularly 1.5:1. The preferences arise from a finding of an improved balance of chroma, optical density, wet-fastness, light-fastness and humidity-fastness properties.
  Preferably the dyes of Formula (I) and Formula (II) are in the form of salts. Preferred salts are alkali metal salts, especially lithium, sodium and potassium salts, ammonium and substituted ammonium salts. Especially preferred salts are salts with ammonia, an organic amine or a quaternary amine (e.g.(CH$_3$)$_4$N$^+$). The dyes may be converted into a salt using known techniques. For example, an alkali metal salt of a dye may be converted into a salt with ammonia or an amine by dissolving an alkali metal salt of the dye in water, acidifying with a mineral acid and adjusting the pH of the solution to pH 9 to 9.5 with ammonia or the amine and removing the alkali metal cations by dialysis.
  The dyes may exist in tautomeric forms other than those shown in this specification. These tautomers are included within the scope of the present claims.
  According to a second aspect of the present invention there is provided an ink comprising:
  (a) from 0.1 to 20 parts of a composition according to the first aspect of the present invention;
  (b) from 80 to 99.9 parts of a liquid medium; wherein all parts are by weight and the number of parts of (a)+(b) add up to 100.
  The number of parts of (a) is preferably from 0.1 to 15, more preferably from 0.5 to 10, and especially from 1 to 5 parts. The number of parts of (b) is preferably from 99.9 to 85, more preferably from 99.5 to 90, especially from 99 to 95 parts.

The preferred weight ratio of the dye of Formula (I) and dye of Formula (II) is as described in relation to the first aspect of the present invention.

A preferred liquid medium includes water, a mixture of water and an organic solvent and an organic solvent free from water.

When the liquid medium comprises a mixture of water and an organic solvent, the weight ratio of water to organic solvent is preferably from 99:1 to 1:99, more preferably from 99:1 to 50:50 and especially from 95:5 to 70:30.

Preferably the liquid medium comprises:

(i) from 30 to 95 parts of water;

(ii) from 10 to 70 parts of organic solvent;

(iii) from 0 to 40 parts of a water dissipatable polymer; and (iv) from 0 to 10 parts of a surfactant;

wherein all parts are by weight and the total number of parts of (i), (ii), (iii) and (iv) add up to 100.

Preferably the organic solvent present in the mixture of water and organic solvent is a water-miscible organic solvent or a mixture of water-miscible organic solvent and water-immiscible organic solvents.

Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol; $C_2$–$C_6$alkylene glycols preferably ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)ethanol, 2-[2-(2-methoxyethoxy)ethoxy]ethanol, 2-[2-(2-ethoxyethoxy)-ethoxy]ethanol, 2-butoxyethanol, 2-(2-butoxyethoxy)ethanol and ethyleneglycol monoallylether; cyclic amides, including optionally substituted oxazolidones, pyrrolidones preferably 2-pyrrolidone; optionally substituted pyrrolidones preferably N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-miscible organic solvents.

Examples of further suitable liquid media comprising a mixture of water and one or more organic solvents are described in U.S. Pat. No. 4,963,189, U.S. Pat. No. 4,703,113, U.S. Pat. No. 4,626,284 and EP 425150A.

Suitable water-immiscible organic solvents include aromatic hydrocarbons, e.g. toluene, xylene, naphthalene, tetrahydronaphthalene and methyl naphthalene; chlorinated aromatic hydrocabons, e.g. chlorobenzene, fluorobenzene, chloronapthalene and bromonaphthalene; esters, e.g. butyl acetate, ethyl acetate, methyl benzoate, benzl benzoate, butyl benzoate, phenylethyl acetate, butyl lactate, benzyl lactate, diethyleneglycol dipropionate, dimethyl phthalate, diethyl phthalate, dibutyl phthalate, di (2-ethylhexyl) phthalate, alcohols having six or more carbon atoms, e.g. hexanol, octanol, benzyl alcohol, phenyl ethanol, phenoxy ethanol, phenoxy propanol and phenoxy butanol; ethers having at least 4 carbon atoms, preferably $C_{5-14}$ ethers, e.g. anisole and phenetole; nitrocellulose, cellulose ether, cellulose acetate; low odour petroleum distillates; turpentine; white spirits; naphtha; isopropylbiphenyl; terpene; vegetable oil; mineral oil; essential oil; and natural oil; and mixtures of any two or more thereof. Benzyl alcohol and phenoxy ethanol are especially preferred.

When the liquid medium comprises an organic solvent free from water, (i.e. less than 1% water by weight) the solvent preferably has a boiling point of from 30° C. to 200° C., more preferably of from 40° C. to 150° C., especially from 50° C. to 125° C. The organic solvent may be water-immiscible, water-miscible or a mixture-of such solvents. Preferred water-miscible organic solvents are any of the hereinbefore described water-miscible organic solvents and mixtures thereof. Preferred water-immiscible organic solvents include any of the hereinbefore described water-immiscible organic solvents and mixtures thereof.

When the liquid medium comprises a water-immiscible organic solvent, preferably a polar solvent is included because this enhances solubility of the dye in the liquid medium. Examples of polar solvents include $C_{1-4}$-alcohols.

According to the second aspect of the invention an ink is provided comprising optionally a water-dissipatable polymer as part of the liquid medium. A water-dissipatable polymer, on dissipation in water or an aqueous solution may form a solution, dispersion, emulsion or suspension, depending on the nature of the water-dissipatable polymer. Preferably the water-dissipatable polymer is soluble in water although a minor amount may be insoluble in water and exist as dispersed particles in aqueous media or water. Preferably the proportion of insoluble polymer is less than 50%, preferably less than 40% and more preferably less than 30% by weight relative to the total weight of the water-dissipatable polymer.

The water-dissipatable polymer preferably bears water-dispersing groups, for example ionised carboxy and/or sulphonate groups, especially ionised sulphonate groups, as these assist water-dissipatability of the polymer. Such groups can be chain pendant and/or terminal. The water-dissipatable polymer may optionally have hydrophilic non-ionic segments, for example polyethylene oxide chains, which may be within the polymer backbone (i.e. in-chain incorporation) or as chain pendant and/or terminal groups.

The water-dissipatable polymer is preferably a water-dissipatable polyvinyl, polyurethane or polyester, more preferably a water-dissipatable polyester.

Water-dissipatable polymers may be prepared as known in the art and as described in WO 98/14524 page 1 line 25 to page 9 line 25, incorporated herein by reference, or for example water-dissipatable polyesters may be purchased from Eastman Kodak Limited or Avecia Limited. Examples include Eastman AQ 29D and Aq 55W.

Preferably the dyes of Formula (I) and (II) are purified by reverse osmosis, ultrafiltration, ion exchange or a combination thereof, either before or after they are incorporated in the ink according to the second aspect of the present invention.

In the ink according to the second aspect of the present invention the composition according to the first aspect of the present invention is preferably soluble in the liquid medium. Preferably the composition is soluble in the liquid medium at 20° C. at a concentration of at least 5% by weight of the ink, preferably at least 6% by weight of the ink, and more preferably at least 7.5% by weight of the ink. This allows the preparation of concentrates which may be used to prepare more dilute inks and reduces the chance of the composition precipitating if evaporation of the liquid medium occurs during storage.

The ink may also contain additional components conventionally used in ink jet printing inks, for example dyes, pigments, viscosity and surface tension modifiers, corrosion inhibitors, light fastness enhancing additives, water fastness enhancing additives, ozone fastness enhancing additives, biocides (e.g. Proxel from Avecia), kogation reducing additives and surfactants which may be ionic or non-ionic. If the ink contains a surfactant, it is preferably a surfactant having a sulpho or sulphate group, a non-ionic surfactant free from carbon-carbon triple bonds, or a mixture thereof.

Inks may be prepared by mixing the composition according to the first aspect of the invention and the liquid medium in any order. Conveniently the composition is mixed with the liquid medium followed by addition of a surfactant and heating and/or stirring and/or sonication of the mixture to dissolve the composition, and the optional water-dissipatable polymer is then mixed in and stirred until homogeneous, to give the ink.

Preferably the ink has been filtered through a filter having a mean pore size $\leq 10$ μm, more preferably $\leq 5$ μm, especially $\leq 2$ μm, more especially $\leq 1$ μm. In this way particulate matter is removed which could otherwise block the fine nozzles used in ink jet printers.

Preferably the ink has a viscosity of $\leq 20$ mPa.s, more preferably $\leq 10$ mPa.s, especially $\leq 5$ mPa.s, at 20° C.

The surface tension of a liquid may be described as the attractive force exerted by molecules below the surface upon the molecules at the surface/air interface and its strength depends on the chemical nature of the liquid. Polar liquids such as water have a higher surface tension when compared with less polar liquids such as ethanol.

The surface tension of ink jet inks is a suitable feature for the evaluation of the usefulness of ink jet inks. Ink jet printer heads used in thermal or piezo ink jet printing are designed to work with inks having specific surface tension, typically in the range of from 25 to 55 dynes $cm^{-1}$. The surface tension of a liquid may easily be lowered by for example the addition of surfactants, however it is not easily raised and thus the surface tension should be at least as high as the value required for the ink jet printer head to work effectively. Too low a surface tension results in poor print quality and or early failure of the ink jet print head. The preferred static surface tension for ink jet inks used with piezo ink jet printing heads is in the range of from 25 to 40 dynes $cm^{-1}$ and for use with thermal ink jet printing heads in the range of from 25 to 50 dynes $cm^{-1}$, measured using the DuNouy Ring method on a Kruss K10 instrument.

Preferably the ink when printed on paper using an ink jet printer gives a solid area coverage with an optical density $\geq 1.0$, preferably $\geq 1.1$ and more preferably $\geq 1.2$.

Preferably the ink has a total concentration of divalent and trivalent metal cations and halide anions below 1000, more preferably below 20, more especially below 10 parts per million by weight relative to the total weight of the ink. Inks of this purity may be prepared by purifying an impure ink, or the components which go into the ink, using standard purification techniques. Suitable techniques include reverse osmosis ultra filtration, ion exchange and combinations thereof.

Preferably the ink is yellow.

The inks of the second aspect of present invention are surprisingly superior to inks containing only one of the dyes of Formula (I) or Formula (II). In particular, the use of the composition according to the first aspect of the invention in ink jet printing inks results in improved storage stability, optical density, solubility, light-fastness and chroma. Image durability, print quality improvements and good wet-fastness of prints are also observed which are of particular value in wide format ink jet printing field.

The inks of the second aspect of the present invention have the advantage that they are suitable not only for the use of piezoelectric ink jet printers but also for the use in thermal, continuous, electrostatic and microelectromechanical ink jet printers.

A third aspect of the invention provides a process for printing an image on a substrate comprising applying thereto an ink according to the second aspect of the present invention by means of an ink jet printer.

The ink jet printer preferably applies the ink to the substrate in the form of droplets which are ejected through a small orifice onto the substrate. Preferred ink jet printers are piezoelectric ink jet printers and thermal ink jet printers. In thermal ink jet printers, programmed pulses of heat are applied to the ink in a reservoir by means of a resistor adjacent to the orifice, thereby causing the ink to be ejected in the form of small droplets directed towards the substrate during relative movement between the substrate and the orifice. In piezoelectric ink jet printers the oscillation of a small crystal causes ejection of the ink from the orifice. Microelectromechanical technology is described for example in WO 00/48938 and WO 00/55089 where ink is ejected from an ink ejection nozzle chamber utilising an electromechcnical actuator connected to a paddle or plunger which moves towards the ejection nozzle of the chamber for the ejection of drops of ink from the ejection nozzle chamber and also in U.S. Pat. No. 6,042,208 (microfluidic ink jet printing).

The substrate is preferably paper, plastic, a textile, metal or glass, more preferably paper, an overhead projector slide or a textile material, especially paper.

Preferred papers are plain or treated papers which may have an acid, alkaline or neutral character.

A further aspect of the present invention provides a paper, an overhead projector slide or a textile material printed with an ink as hereinbefore defined.

A still further aspect of the invention provides an ink jet printer cartridge comprising a chamber, optionally refillable, containing an ink according to the second aspect of the present invention in the chamber.

The invention is further illustrated by the following Examples in which all parts, percentages and ratios are by weight unless otherwise stated.

Preparation of dyes of Formula (I)

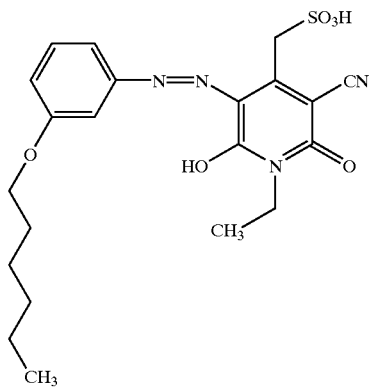

Dye 1

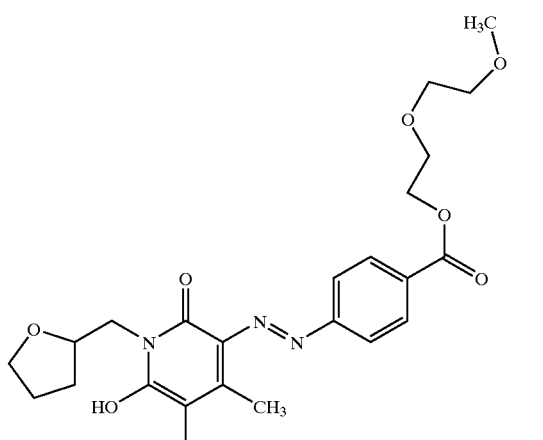

Dye 2

Dye 1 was prepared using stages 1a and 1b described below:

Stage 1a

Preparation of a Pyridone Component

4-Chloroethylacetoacetate (115 g, 0.70 mol) was added dropwise to a suspension of sodium sulphite (88.2 g, 0.70 mol) in water (70 cm³) at 60–70° C. The reaction mixture was stirred for 2 hours at 60–70° C. and then ethyl cyanoacetamide (78.4 g, 0.70 mol) (prepared by the reaction of ethylamine with ethyl cyanoacetate) was added, followed by the dropwise addition of ethylene diamine (24 cm³, 0.36 mol). The reaction mixture was heated at 95° C. for 2 hours and then heated at reflux for 24 hours.

The reaction mixture was cooled to −5° C., acidified to pH=1 with conc. HCl and left to stand for 1 hour at 0° C. The resulting product was isolated by filtration, dispersed in acetone (500 cm³), re-filtered and dried to give the pyridone coupling component (79.8 g).

Stage 1b

3-Hexylaniline (19.3 g, 0.1 mol) was added portionwise with stirring to 2M hydrochloric acid (500 cm³) at 0–5° C. After the reaction mixture was allowed to stir for 10 minutes, sodium nitrite solution (40% w/w, 17.5 cm³, 0.1 mol) was added over 5 minutes and the reaction mixture than allowed to stir for a further 10 minutes. The excess nitrous acid was destroyed using sulphamic acid.

The pyridone component from Stage 1a (27.4 g, 0.1 mol) was added to the reaction mixture and the resultant yellow precipitate was stirred at 0–5° C. for 30 minutes. The pH was raised to 4.5 with sodium acetate and the reaction mixture then stirred for a further 2 hours whilst rising to room temperature. The product was collected by filtration, washed with water and dried to give a yellow dye (Dye 1) (yield= 38.6 g, 83%).

Dye (2) was prepared using stages 2a to 2c described below:

Stage 2a

4-Nitrobenzoylchloride (55.7 g) in CH$_2$Cl$_2$ (100 cm³) was added dropwise to a mixture of 2-(2-methoxyethoxy)ethanol (36 g) and pyridine (32 cm³) in CH$_2$Cl$_2$ (200 cm³) keeping the temperature below 10° C. After isolation the resultant nitro compound was converted to the corresponding amino compound using H$_2$ gas and a palladium catalyst in ethanol.

Stage 2b

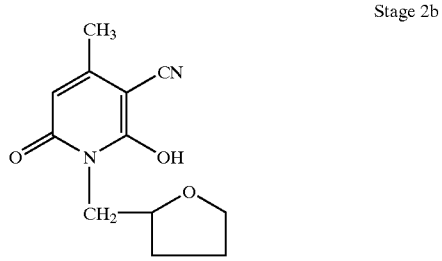

Ethyl acetoacetate (65.07 g) was added dropwise over 30 minutes to a stirred mixture of tetrahydrofurfurylamine (122.92 g) and water (18 g) at room temperature. Ethyl cyanoacetate (56.6 g) was then added. After heating to 90° C. for 20 hours the solution was cooled and poured onto ice (150 g) and acidified by addition of concentrated hydrochloric acid. The resulting product was filtered-off, washed with water and dried at 45° C. under reduced pressure.

Stage 2c

The amino compound from Stage 2a (11.9 g) was added to a mixture of water (30 cm³) and hydrochloric acid (12.3 cm³) and the solution cooled to 0–5° C. A solution of sodium nitrite (3.46 g) in the minimum of water was then added dropwise keeping the temperature at 0–5° C. After stirring for a further 20 minutes the excess nitrous acid was destroyed by the addition of sulphamic acid. The resulting diazonium salt solution was slowly added to a solution of the product from stage 2b (11.61 g) in methanol (200 cm³) keeping the temperature below 10° C. After stirring for a further 30 minutes the yellow suspension was diluted with water (200 cm³) and the product filtered-off and recrystallised from methanol to give 15.8 g of Dye 2 having a λmax at 434 nm.

Dye 3

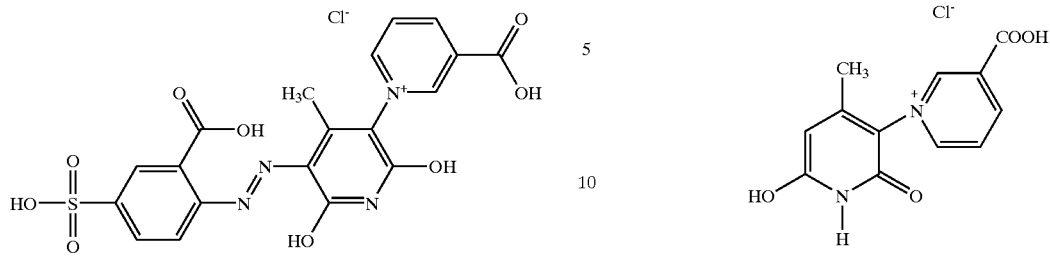

Dye (3) was prepared as the sodium salt using stages 3a to 3d as described below:

Stage 3a: Preparation of Intermediate (A)

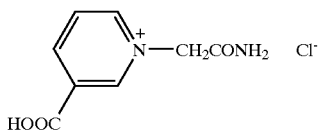

Intermediate (A)

Chloroacetamide (339.4 g at 98% strength) was added to N,N-dimethylformamide (DMF) (2 L). To the resulting solution was added nicotinic acid (466.4 g at 98% strength) followed by further DMF (800 cm$^3$) whilst warming the mixture to 90° C. The mixture was stirred at this temperature for 2½ hours and allowed to cool to room temperature. The resulting precipitate was filtered-off, washed with acetone and dried under vacuum at 50° C. to give Intermediate (A). (Yield=478 g).

Stage 3b: Preparation of Intermediate (B):

Intermediate (B)

Intermediate (A) (450 g) was added to ethylacetoacetate (277.2 g) and methylated spirit740 P (1.25 L). To this was added sodium hydroxide pellets (188.5 g in total dissolved in methylated spirit 740 P (800 cm$^3$) and water (840 cm$^3$)). The mixture was then heated to reflux for total of 17 hours and then cooled to room temperature. The resulting solid was filtered-off, washed with methylated spirit 740 P and dried under vacuum 40° C. to give Intermediate (B). (Yield= 102.2 g at 33% strength).

Stage 3c: Diazotisation and Coupling

2-Carboxy-4-sulphoaniline (60.75 g at 89% strength) was dissolved in water (600 cm$^3$) at pH 7–8 by addition of 2N NaOH (aq) and sodium nitrite (19.0 g). This solution was then added to a mixture of conc. HCl (162 cm$^3$) in water (200 cm$^3$). The resultant solution was stirred at for 2 hours whilst maintaining the temperature below 10° C. Excess nitrous acid in the solution was then destroyed by addition of sulphamic acid.

To the resultant solution was added a solution of Intermediate (B) (76.8 g at 33% strength) in water (800 cm$^3$). The resultant mixture was diluted to 7 L with de-ionised water and was adjusted to pH 7 by addition of 2N NaOH. The mixture was stirred over night, salted to 15% w/v with NaCl and the pH adjusted to 5–6 by addition of conc. HCl. The resulting solid was filtered-off, washed and pulled dry in a filter.

Stage 3d
Purification

The solid product of stage 3c was re-dissolved in distilled water (approx. 4 L) at pH 9.5 and desalinated by reverse osmosis. The solution was then screened and the water evaporated to give Dye 3 in the form of its sodium salt. (Yield=117 g).

Preparation of Dyes of Formula II Dye 4

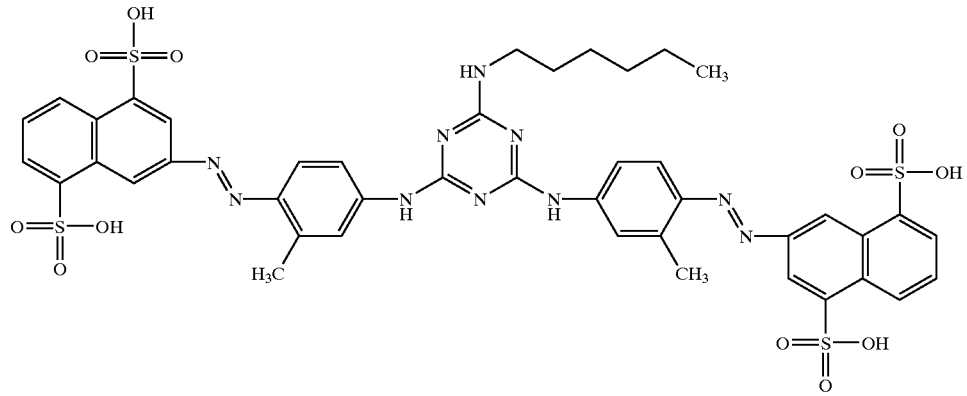

Dye 4 was prepared using stages 4a–c as described below:

Stage 4a

A solution of sodium nitrite (13.6 g) in water (20 cm³) was added dropwise with stirring to a suspension of 2-aminonaphthalene-4,8-disulphonic acid (82.5 g) in a mixture of concentrated hydrochloric acid (73 cm³) and water (380 cm³) at 0–5° C. After the addition was complete, the reaction mixture was allowed to stir for 30 minutes to give a diazo solution and then the excess nitrous acid was destroyed using sulphamic acid.

A solution of m-toluidine (19.82 g) in acetone (75 cm³) was then added dropwise with stirring to the above solution, whilst maintaining the temperature at 0–5° C. The reaction mixture was stirred for 30 minutes and then the pH was raised to 4.5 with sodium acetate. Sodium chloride was added to 10% w/v over 30 minutes and a red precipitate formed. The reaction mixture was allowed to rise to room temperature and stirred overnight. The precipitate was collected by filtration, washed with 15% w/v sodium chloride solution and dried under vacuum to give a monoazo intermediate (yield=135 g at 52% purity).

Stage 4b

The monoazo intermediate resulting from stage 4a (64.5 g) was placed in water (140 cm³) and dissolved by adjusting to pH 7 with 2M sodium hydroxide solution to give a monoazo solution.

Cyanuric chloride (7.4 g) was dissolved in acetone (100 cm³) and added dropwise with stirring to ice/water (1000 cm³) over 15 minutes. After the addition was complete, the resultant fine white suspension was stirred at 0–5° C. for 15 minutes and then half of the monoazo solution was added over 30 minutes, whilst maintaining the pH at pH 4–5 (via addition of 1N sodium hydroxide solution) and the temperature at 0–5° C. After stirring for a further 2 hours, the remainder of the monoazo solution was added. The reaction mixture was allowed to rise to room temperature and stirred overnight, whilst the pH was maintained at 7 with 1M sodium hydroxide solution. The addition of sodium chloride (15% w/v) resulted in the precipitation of a monochloro intermediate. After stirring for a further 2 hours, the precipitate was collected by filtration and dried under vacuum to give a yellow monochloro intermediate (yield=50 g).

Stage 4c

The monochloro intermediate from stage 4b was added to a mixture of water (200 cm³), hexylamine (12.1 g) and 1,4-diazabicyclo[2.2.2.]octane (1.5 g) and the reaction mixture was stirred at 70–75° C. overnight. The reaction mixture was cooled to room temperature and the pH lowered to pH 7 with 2M hydrochloric acid. The resultant precipitate was collected by filtration, washed with water (1000 cm³) and dried to give a yellow dye, (Dye 4) (yield=15 g).

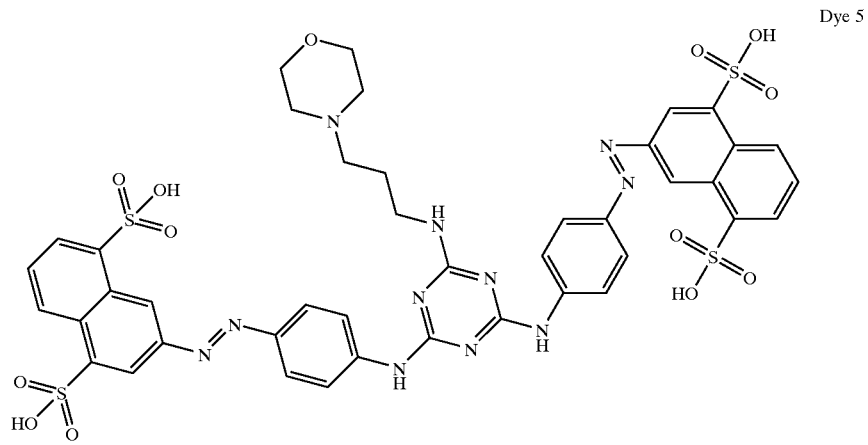

Dye 5

Dye 5 was prepared using stages 5a–5c as described below:

Stage 5a

2-Aminonapthalene-4,8-disulphonic acid (837.6 g) was dissolved in distilled water (4 L). Hydrochloric acid (728 cm³) was added slowly over 10 mins and the reaction mixture was cooled to below 5° C. by both the addition of ice and external cooling. Sodium nitrite (130 g) dissolved in water (260 cm³) was added slowly over 30 min, keeping the temperature below 5° C. The excess nitrous acid was destroyed using sulphamic acid and then a solution of aniline-ω-methanesulphonate (482.2 g) in water (1 L) was added over 20 minutes, keeping the temperature below 10° C. Sodium acetate (550 g) was added to raise the pH to 4.5 and the reaction mixture was stirred at below 10° C. for 2 hours, then allowed to rise to room temperature overnight. The reaction mixture was salted to 10% w/v with sodium chloride, stirred for 30 minutes, collected by filtration and then washed with 15% brine to give a paste.

The paste was charged to a flask, to which water (4 L) was added. 46% sodium hydroxide liquor (1361 g) was added over 10 minutes and the mixture was then stirred at 70–80° C. for 7 hours. The mixture was allowed to cool to 50° C., salted to 10% w/v with sodium chloride, cooled to 40° C. and filtered. The resulting product was washed with 15% brine and then dried. Yield=695 g.

Stage 5b

A solution of cyanuric chloride (36.9 g) dissolved in acetone(350 cm³) was added to a mixture of ice/water (2 L) over 20 minutes. After stirring for 15 minutes, a solution of the product from stage 5a (136.6 g) in water (4 L) was added over 30 minutes, keeping the temperature below 5° C. and the pH between 4 and 5, by the addition of 2M sodium hydroxide solution. Once the addition was complete, the reaction mixture was stirred for 15 minutes and then adjusted to pH 6.5 with 2M sodium hydroxide and stirred for a further 2.5 hours whilst keeping the temperature below 5° C.

A further solution of product from stage 5a (136.6 g in 4 L water) was added and the reaction mixture was allowed to warm to room temperature whilst stirring overnight at pH 7. The reaction mixture was heated to 50° C. and salted to 7.5% w/v with sodium chloride. The stirred reaction mixture was cooled to 40° C., filtered-off and dried to give a monochlorotriazinyl product (yield=282 g)

Stage 5c

The monochlorotriazinyl product from stage 5b (65 g) was dissolved in water (1.25 L) containing 4-(3-aminopropyl)morpholine (27.6 g), and the resultant mixture was heated with stirring at 70–80° C. for 3 hours. The mixture was allowed to cool to 45° C. and salted to 20% w/v with sodium chloride. The precipitate was collected by filtration and washed with 25% brine to give a paste. The paste was dissolved in distilled water, desalinated and then evaporated to dryness to give 65 g of Dye 5.

Dye 6

Dye 6 is Cl Direct Yellow 86 available from Orion Dyes.

Preparation of Compositions of the Invention

EXAMPLES 1 TO 5

Compositions were prepared by simple blending of the dyes, using the ratios shown in Table 1 below:

TABLE 1

| Example | Dyes Formula (I) | Formula (II) | Ratio (w/w) |
|---|---|---|---|
| 1 | Dye 1 | Dye 4 | 1:1 |
| 2 | Dye 2 | Dye 6 | 1:1 |
| 3 | Dye 2 | Dye 4 | 1:1 |
| 4 | Dye 3 | Dye 6 | 1:1 |
| 5 | Dye 1 | Dye 5 | 1:1 |

Preparation of Inks of the Invention

INK EXAMPLE IE1 TO IE5 AND COMPARATIVE EXAMPLES CIE1 TO CIE4

Inks of the invention additionally contained a water-dissipatable polymer (Resin 1) prepared as described below using the components as listed below in Table 2:

Resin 1

A glass reactor fitted with a distillation column and condenser was charged with components A, B, D, E, F, G and 50% of C and 50% of H. The contents were heated with stirring to a reaction temperature of 210° C. until the mixture was clear and the acid value was below 10 mgKOH/g. At this point the remainder of C and H were charged to the reactor and the temperature raised to 230° C. The reaction was continued under reduced pressure until an acid value of 9.4 mgKOH/g was obtained. The resin was further characterised as having a hydroxyl value of 12.8 mgKOH/g, the ICI Cone and Plate Viscosity was measured as greater than 500 Pa.S at 125° C. and the resin had a Tg (onset); measured by Differential Scanning Calorimetry, of 18° C. The number average molecular weight as determined by gel permeation chromatography (PS Equivalent) was 1800. The resin was readily dispersed in warm distilled water to give a clear solution having a solids content of 20% w/w (hereinafter "Resin 1").

TABLE 2

| Components | Abbreviation | Weight (g) |
|---|---|---|
| Neopentyl glycol | A | 15 |
| Diethylene glycol | B | 10 |
| Isophthalic acid | C | 45 |
| Sodio-5-sulpho-isophthalic acid | D | 10 |
| Hexane-1,6-diol | E | 10 |
| Methoxy PEG 750 | F | 10 |
| Sodium acetate | G | 0.2 |
| Fascat 4101 | H | 0.1 |

Inks of the invention (ink examples IE1 to EI5) and comparative ink examples CIE1 to CIE4 were prepared using the components as listed below in Table 3.

TABLE 3

| Components parts by weight | Ink Example | | | | | Comparative Ink Example (CIE) | | | |
|---|---|---|---|---|---|---|---|---|---|
| | IE1 | IE2 | IE3 | IE4 | IE5 | CIE1 | CIE2 | CIE3 | CIE4 |
| Dye 1 | 1.5 | — | — | — | 1.5 | 3 | — | — | — |
| Dye 2 | — | 1.5 | 1.5 | — | — | — | — | 3 | — |
| Dye 3 | — | — | — | 1.5 | — | — | — | — | 3 |
| Dye 4 | 1.5 | — | 1.5 | — | — | — | 3 | — | — |
| Dye 5 | — | — | — | — | 1.5 | — | — | — | — |
| Dye 6 | — | 1.5 | — | 1.5 | — | — | — | — | — |
| 2-Butoxyethanol | 12 | 12 | — | 12 | 12 | 12 | 12 | — | — |
| Benzyl alcohol | — | — | 12 | — | — | — | — | 12 | 12 |
| 2-Pyrrolidone | 20 | 20 | 20 | 20 | 20 | 20 | 20 | 20 | 20 |
| DIOSS* | 3 | 3 | 3 | 3 | 3 | 3 | 3 | 3 | 3 |
| Resin 1 | 20 | 20 | 20 | 20 | 20 | 20 | 20 | 20 | 20 |
| Water | 42 | 42 | 42 | 42 | 42 | 42 | 42 | 42 | 42 |

*Di-isoctylsulphosuccinate sodium salt (anionic surfactant).

Printing Results

The inks as prepared above were placed in an ink jet printer cartridge and the cartridge loaded into a Canon BJC 4300 ink jet printer, or an Olivetti JP192 ink jet printer.

The inks were printed onto Epson Glossy Film, (EPSGF) Xerox Acid (XA) and Canon PB plain papers, and Canon HR101, GP301 and HG201 special ink media, preferred media are Canon GP301, HG201 and Epson Glossy Film.

The optical density, chroma, wet-fastness and light-fastness properties were measured and the properties of the resulting prints are summarised in the following Table 4.

Optical Density

The optical density is a measure of the colour strength of a printed image and is expressed as a number without units. The higher the value, the stronger the print is. Optical density was measured using an X-Rite 938 spectrodensitometer.

Chroma

Chroma is a measure of brightness, also described as the colour saturation of a print. Chroma was measured using an X-Rite 938 spectrodensitometer and is derived from a* and b* components of CIE Lab colour space where chroma=√(a²+b²). The higher the value, the stronger the chroma is.

Wet-fastness

To measure wet-fastness a print with horizontal lines, each one 2 mm wide and spaced 5 mm apart was mounted at an angle of 45° C. and 0.5 cm³ of water was allowed to run over an area of the print. The amount of colour washed down the print was assessed by comparison to a standard scale and rated print was assessed by comparison to a standard scale and rated from 1 to 10 where 10 indicates no colour removal.

Light-fastness

Light-fastness was measured by covering half of a print sample with aluminium foil and exposing the sample in an Atlas Ci 35 Weatherometer for 100 hours. The colour difference between the exposed and unexposed print was measured using an X-Rite 938 spectrodensitometer and expressed as $\Delta E = \sqrt{(\Delta L^2 + \Delta a^2 + \Delta b^2)}$. The lower the value $\Delta E$ the better the light-fastness was.

Surface Tension of the Inks

The surface tension of the inks formulated as described above were measured using the DuNouy Ring method with a Kruss K10 at room temperature, and were found to be 34 dynes cm⁻¹.

Viscosity

Ink viscosity's were measured on a TA Instruments rheometer using cone and plate geometry at 25±1° C. and the viscosity's obtained were in the range of from 3.5 mPa.s to 4.5 mPa.s.

TABLE 4

| Ink Example | Comparative Ink Example | Dye | Paper | Optical Density | Chroma | Wet-fastness | *Light-fastness |
|---|---|---|---|---|---|---|---|
| Canon BJC 4300 Ink Jet Printer | | | | | | | |
| | CIE1 | 1 | XA | 0.89 | 71 | 9 | 19 |
| | CIE2 | 4 | XA | 0.70 | 63 | 10 | 13 |
| IE1 | | 1 + 4 | XA | 0.92 | 73 | 9 | 16 |
| | CIE1 | 1 | PB | 0.94 | 71 | 10 | 16 |
| | CIE2 | 4 | PB | 0.71 | 63 | 10 | 10 |
| IE1 | | 1 + 4 | PB | 0.96 | 74 | 10 | 15 |
| | CIE1 | 1 | HR101 | 0.98 | 81 | 10 | 85 |
| | CIE2 | 4 | HR101 | 0.72 | 66 | 10 | 13 |
| IE1 | | 1 + 4 | HR101 | 0.97 | 81 | 10 | 36 |
| | CIE1 | 1 | GP301 | 1.31 | 101 | 10 | 26 |
| | CIE2 | 4 | GP301 | 0.87 | 79 | 10 | 19 |
| IE1 | | 1 + 4 | GP301 | 1.34 | 102 | 10 | 24 |
| | CIE1 | 1 | HG201 | 1.13 | 96 | 8 | 22 |
| | CIE2 | 4 | HG201 | 0.84 | 78 | 7 | 15 |
| IE1 | | 1 + 4 | HG201 | 1.22 | 101 | 7 | 16 |
| Olivetti JP 192 Ink Jet Printer | | | | | | | |
| | CIE1 | 1 | HG201 | 1.24 | 103 | 9 | 46.7 |
| IE5 | | 1 + 5 | HG201 | 1.30 | 109 | 7 | 20.5 |
| | CIE3 | 2 | EPSGF | 0.97 | 103 | 9 | 75.1 |
| IE2 | | 2 + 6 | EPSGF | 1.30 | 109 | 8 | 35.8 |
| IE3 | | 2 + 4 | EPSGF | 1.22 | 108 | 8 | 45.0 |
| | CIE4 | 3 | EPSGF | 0.99 | 98 | 7 | 9.9 |
| IE4 | | 3 + 6 | EPSGF | 1.23 | 105 | 7 | 9.9 |

*ΔE after 100 hours

Ink Stability Data

Ink Example 1 and Comparative Ink Examples 1 and 2 were also stored at ambient temperature (20–25° C.) and 60° C. for one month. Assessment of ink stability with respect to dye crystallisation/precipitation was made visually and using a microscope and the results are shown below in Table 5.

TABLE 5

| Ink | Room Temp | 60° C. |
|---|---|---|
| IE1 | Clear | Clear |
| CIE1 | Clear | Slightly cloudy |
| CIE2 | Slight precipitation | Slight precipitation |

Further Inks

The inks described in Table 6 may be prepared wherein the first and second column describe the dyes making up the composition and ratio of dyes used. Numbers quoted in the third column onwards refer to the number of parts of the relevant ingredient and all parts and ratios are by weight and water is used to make up the number of parts to 100. The inks may be applied to paper by thermal or piezo ink jet printing.

The following abbreviations are used in Table 6

PG=propylene glycol
DEG=diethylene glycol
NMP=N-methyl pyrollidone
DMK=dimethylketone (acetone)
IPA=isopropanol
MEOH=methanol
2P=2-pyrollidone
MIBK=methylisobutyl ketone
P12=propane-1,2-diol
CET=cetyl ammonium bromide
NaOH=Sodium hydroxide

TABLE 6

| Dyes | Dye Ratio | Composition Dye Content | PG | DEG | NMP | DMK | NaOH | Sodium Stearate | IPA | MEOH | 2P | MIBK | P12 | CET |
|---|---|---|---|---|---|---|---|---|---|---|---|---|---|---|
| 1 + 4 | 1:2 | 2.0 | 5 | | 6 | 4 | | | | | 5 | | 3 | 3 |
| 2 + 4 | 1.3 | 3.0 | | 5 | 5 | | 0.2 | | | | | | | |
| 3 + 4 | 1:1 | 10.0 | 3 | | 3 | 3 | | | 5 | 1 | | | | |
| 1 + 5 | 1:4 | 2.1 | | 8 | | | | | | | | 1 | | |
| 2 + 4 | 1:5 | 3.1 | 5 | | | | | 0.2 | 4 | | 5 | 2 | | |
| 3 + 5 | 1:2.5 | 1.1 | | | 9 | | 0.5 | 0.5 | | 9 | | | | 0.5 |
| 4 + 5 | 1:2 | 2.5 | 4 | 15 | 3 | 3 | | | 6 | 10 | 5 | 4 | 1 | |
| 2 + 4 | 1:3 | 5 | | 20 | | | | 10 | | | | | | |
| 1 + 5 | 1:4 | 2.4 | 5 | 4 | 5 | | | | 6 | | 5 | | | |

TABLE 6-continued

| Dyes | Dye Ratio | Composition Dye Content | PG | DEG | NMP | DMK | NaOH | Sodium Stearate | IPA | MEOH | 2P | MIBK | P12 | CET |
|---|---|---|---|---|---|---|---|---|---|---|---|---|---|---|
| 1 + 4 | 1:19 | 4.1 | 3 | 5 | 2 | 10 | | 0.3 | | | | | | |
| 2 + 4 | 1:1 | 3.2 | | 5 | 4 | 6 | | | 5 | 4 | 6 | 5 | 6 | |
| 2 + 5 | 19:1 | 5.1 | | | | | | | | 4 | | | | 0.5 |
| 3 + 4 | 1:6 | 10.8 | 5 | | | | | | 5 | | | | | |
| 2 + 5 | 1:4 | 10.0 | 2 | 6 | 2 | 5 | | | 1 | | 4 | | | |
| 1 + 5 | 1:2 | 1.8 | | 5 | | | | | | | 15 | | 2 | 2 |
| 3 + 4 | 1:3.5 | 2.6 | | | 11 | | | | | | 5 | | | |
| 2 + 4 | 1:2 | 3.3 | 2 | | | 10 | | | | 2 | | 6 | | |
| 1 + 5 | 1:2 | 12.0 | | | | 7 | 0.3 | | 3 | | | | | |
| 3 + 1 | 1:3 | 5.4 | 2 | 20 | 2 | 1 | | | | | 3 | 3 | 1 | |
| 3 + 5 | 1:3 | 6.0 | | | 4 | | | | 5 | | | | | |

What is claimed is:

1. A composition comprising a dye of Formula (I) and a dye of Formula (II) or salts thereof:

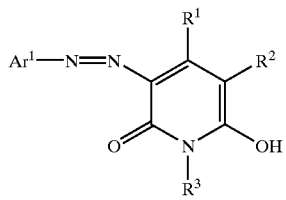

Formula (I)

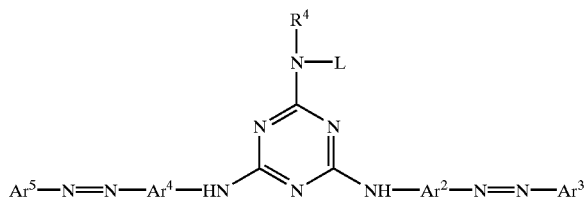

Formula (II)

wherein
Ar¹, Ar², Ar³, Ar⁴ and Ar⁵ are each independently optionally substituted aryl;
R¹ is alkyl, alkenyl, alkynyl, pyridinium or aryl, each of which is substituted or unsubstituted, or H;
R² is alkyl, alkenyl, alkynyl, pyridinium or aryl each of which is substituted or unsubstituted, H, C(O)OH, CN, NR⁵R⁶, or C(O)NR⁵R⁶; and
R³, R⁴, R⁵ and R⁶ each independently are alkyl, alkenyl, alkynyl or aryl,
each of which is substituted or unsubstituted, or H,
L is H or L and R⁴ together with the N atom to which they are attached form an optionally substituted 5- or 6-membered ring.

2. A composition according to claim 1 wherein L is H.

3. A composition according to claim 1 wherein the dye of Formula (I) is:

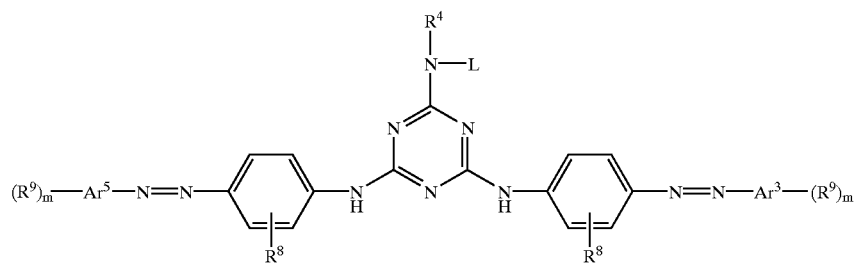

wherein:

R⁷ is alkyl, alkoxy, alkenyl, alkynyl or aryl, each of which is substituted or unsubstituted, H, SO₃H, C(O)OH, PO₃H, NR⁵R⁶, or C(O)NR⁵R⁶; and p is 0, 1, 2 or 3.

4. A composition according to claim 1 wherein the dye of Formula (II) is:

wherein:
each R⁸ independently is alkyl, alkenyl, alkynyl or aryl, each of which is substituted or unsubstituted, H, NHC(O)R⁵ or NHC(O)NR⁵R⁶;
each R⁹ independently is alkyl, alkenyl, alkynyl or aryl, each of which is substituted or unsubstituted, H, SO₃H, PO₃H, or NH₃⁺; and
each m independently is 0, 1, 2 or 3.

5. A composition according to claim 1 wherein R¹ is C₁–C₂₅alkyl, C₂–C₂₅alkenyl, C₂₋₂₅alkynyl, pyridinium or aryl, each of which is substituted or unsubstituted, or H.

6. A composition according to claim 1 wherein R² is C₁–C₂₅alkyl, C₂–C₂₅alkenyl, C₂–C₂₅alkynyl, pyridinium or aryl, each of which is substituted or unsubstituted, H, C(O)OH, CN, NR⁵R⁶, or C(O)NR⁵R⁶.

7. A composition according to claim 1 wherein $R^3$, $R^4$, $R^5$ and $R^6$ each independently are $C_1$–$C_{25}$alkyl, $C_2$–$C_{25}$alkenyl, $C_2$–$C_{25}$alkynyl or aryl, each of which is substituted or unsubstituted, or H.

8. A composition according to claim 3 wherein $R^7$ is $C_1$–$C_{25}$alkyl, $C_1$–$C_{25}$alkoxy, $C_2$–$C_{25}$alkenyl, $C_2$–$C_{25}$alkynyl or aryl, each of which is substituted or unsubstituted, H, $SO_3H$, $C(O)OH$, $PO_3H$, $NR^5R^6$, or $C(O)NR^5R^6$.

9. A composition according to claim 4 wherein each $R^8$ independently is $C_1$–$C_{25}$alkyl, $C_2$–$C_{25}$alkenyl, $C_2$–$C_{25}$alkynyl or aryl, each of which is substituted or unsubstituted, H, $NHC(O)R^5$ or $NHC(O)NR^5R^6$.

10. A composition according to claim 4 wherein each $R^9$ independently is $C_1$–$C_{25}$alkyl, $C_2$–$C_{25}$alkenyl, $C_2$–$C_{25}$alkynyl or aryl, each of which is substituted or unsubstituted, H, $SO_3H$, $PO_3H$, or $NH_3^+$.

11. A composition according to claim 1 wherein $Ar^1$, $Ar^2$, $Ar^3$, $Ar^4$ and $Ar^5$ each independently are phenyl or napthyl.

12. A composition according to claim 1 wherein the dye of Formula (I) and dye of Formula (II) are in a weight ratio of from 10:1 to 1:10.

13. An ink comprising:
   (a) from 0.1 to 20 parts of the composition according to claim 1;
   (b) from 99.9 to 80 parts of a liquid medium,
   wherein all parts are by weight and the number of parts of (a)+(b) add up to 100.

14. An ink according to claim 13 wherein the liquid medium comprises:
   (i) from 30 to 95 parts of water;
   (ii) from 10 to 70 parts of organic solvent;
   (iii) from 0 to 40 parts of a water dissipatable polymer; and
   (iv) from 0 to 10 parts of a surfactant;
   wherein all parts are by weight and the total number of parts (i), (ii), (iii) and (iv) add up to 100.

15. An ink according to claim 14 wherein the organic solvent is a water-miscible organic solvent.

16. An ink according to claim 14 wherein the organic solvent is a mixture of a water-miscible organic solvent and a water-immiscible organic solvent.

17. An ink according to claim 16 wherein the ratio of the water-miscible solvent to water-immiscible organic solvent is 19:1 to 1:1 by weight.

18. An ink according to claim 13 which has been filtered through a filter having a mean pore size $\leq 10$ μm.

19. An ink according to claim 13 having a viscosity $\leq 20$ mPa.s at 20° C.

20. An ink according to claim 13 having a static surface tension in the range of from 25 to 55 dynes $cm^{-1}$.

21. An ink according to claim 13 which is yellow.

22. A process for the coloration of a substrate comprising printing an ink onto the substrate using an ink-jet printer characterised in that the ink is as defined in claim 13.

23. A process according to claim 22 wherein the substrate is paper, transparent material or a textile material.

24. A paper, an overhead projector slide or textile material printed with an ink according to claim 13 or by means of a process according to claim 22.

25. An ink-jet printer cartridge comprising a chamber and an ink according to claim 13, wherein the ink is present in the chamber.

* * * * *